July 7, 1942.  E. J. PRATT  2,289,068
FILTER
Filed Feb. 13, 1939

Inventor.
Elmer J. Pratt.
Daniel Brennan
Attorney.

Patented July 7, 1942

2,289,068

UNITED STATES PATENT OFFICE 2,289,068

FILTER

Elmer J. Pratt, Chicago, Ill.

Application February 13, 1939, Serial No. 256,062

9 Claims. (Cl. 210—166)

The invention relates to filters for thermostats, and more particularly to filters having parts secured together and arranged to separate at a pre-determined temperature.

Most water cooled motor vehicles are equipped with thermostats in their water circulating systems to maintain a suitable water temperature, to effect an efficient performance of the motors and hot water heaters. In operation during cold weather, the thermostat remains closed until the water temperature is sufficiently high to insure efficient operation of the motor, at which time it opens automatically to enable the water pump to force the water to flow through the radiator.

A thermostat usually performs satisfactorily if the cooling system is entirely free from particles of dirt, etc. This ideal condition almost never prevails, consequently the operation of the thermostat is erratic and in many instances fails completely, because the cooling system usually gathers bits of rubber from the hose connections and scale from the castings, as well as other dirt particles which are in the added water or other liquid. While the motor is operating, these foreign particles are picked up and circulated through the thermostat and often lodge on the valve seat when the thermostat is closing. As a result, the water flow, to the radiator, cannot be reduced sufficiently to cause a rapid enough rise in temperature for satisfactory motor operation or heater efficiency.

It is therefore, an object of the invention to provide means, associated with a thermostat, to prevent impaired operation of the water circulating system.

Another object is to provide a filter of the character described with temperature responsive means to effect unrestricted passage of liquid after the filter has become clogged.

The foregoing, and such other objects of the invention as will appear hereinafter as the description proceeds, will be more readily understood from a perusal of the following specification, in which reference is made to the accompanying drawing; wherein.

Figure 2:
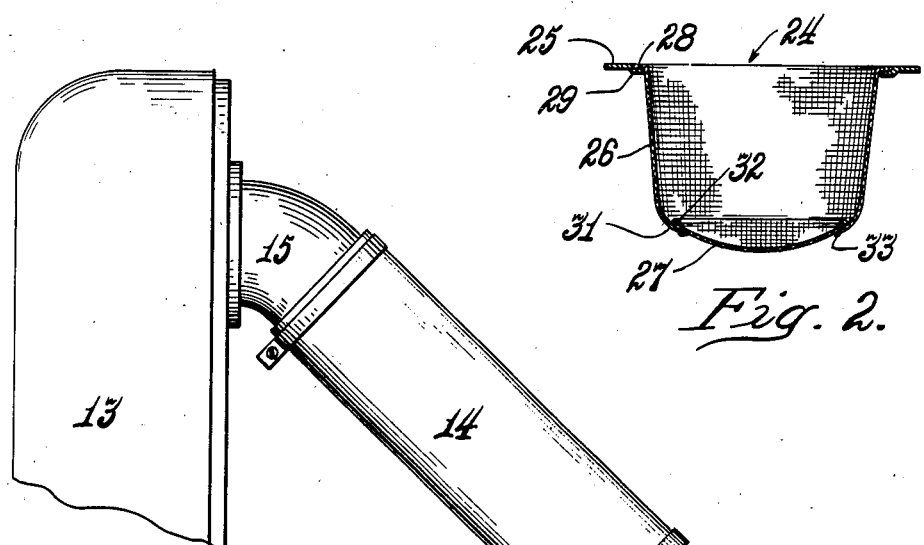
Fig. 2 is an enlarged vertical sectional view through the filter.

As illustrated in the accompanying drawing, the cooling system includes a water chamber 11 in the cylinder head 12, a radiator 13, a hose 14 and fitting 15 and 16 which connect said water chamber and radiator.

In the conventional installation illustrated, a thermostat 17 is mounted within fitting 16 and includes flange 18, clamped between the fitting 16 and cylinder head 12. A hollow body portion 19, open at the bottom, extends upwardly and has transversely aligned openings 21 to be closed by valves 22. Movement of the valves 22 into open or closed position is effected through a bimetal control 23 which extends through the bottom opening of body 19, as shown. While the motor is operating during cold weather, the valves 22 are closed and remain so until the water reaches a temperature sufficiently high for efficient motor operation. When the valves open, the water flows through hose 14 into the radiator 13 and back to the water chamber 11. Frequently a pump (not shown) is utilized in the circulating system to create a forced flow.

It is obvious that when dirt or other foreign particles lodge on the thermostatic valve or valve seat it will prevent the valve from closing tightly, thus rendering the thermostat inefficient and erratic in operation. To prevent dirt getting on the valve or valve seat, a filter 24 is provided. As illustrated, the filter 24 has an external circumferential flange 25 which is fitted below the mounting flange 18 and securely clamped in place. The filter preferably consists of a cylindrical body 26 open at its ends, and an insert 27 normally secured in one of said ends.

As best shown in Fig. 2, the body 26, which is made of screening (approximately 70 mesh) has an external annular flange 28 on its upper end and converges inwardly slightly at its lower end to provide an internal shoulder 31. The mounting flange 25 is annularly recessed at 29 to receive the annular flange 28 which is soldered or otherwise secured therein. The removable screen insert 27 preferably is dished and has its circumferential margin 32 folded over. Said insert's diameter is slightly larger than the smallest diameter of shoulder 31 so that it rests upon the shoulder, as illustrated. It is retained in place by a fusible alloy, which preferably melts at substantially the boiling point of the liquid used in the circulating system, such as a solder 33, having a melting temperature when water is used in the circulating system, of approximately 212° F. It is of course understood that the liquid used in the circulating system is not always water, but varies, as, for example, in the wintertime when alcohol or other liquids which freeze at a lower temperature than water are used. Some of these liquids, for example, boil at a lower temperature than 212° F. Alcohol, for example, boils approximately at 162° F. One of the dangers to the engine is that if the filter clogs up, the temperature of the liquid in the circulating system rises to a point where this liquid boils and evaporates and passes out of the system. If the filter section 27 does not open before this happens, then a large amount of the liquid in the circulating system will pass out in vapor and there will not be enough, even though it is circulating, to prevent injury to the engine. It is important therefore that the solder used shall fuse at substantially the temperature at which the liquid in the circulating system boils, preferably shortly before it boils.

Figure 1:
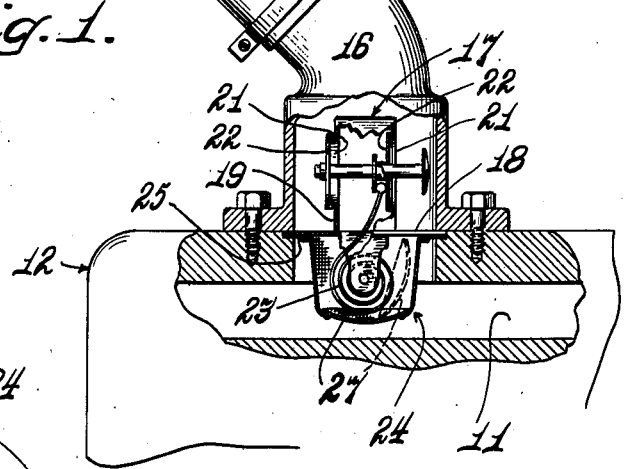
Fig. 1 is a fragmentary assembly view, partly in section, showing the filter and thermostat mounted within a cooling system.
Figure 3:
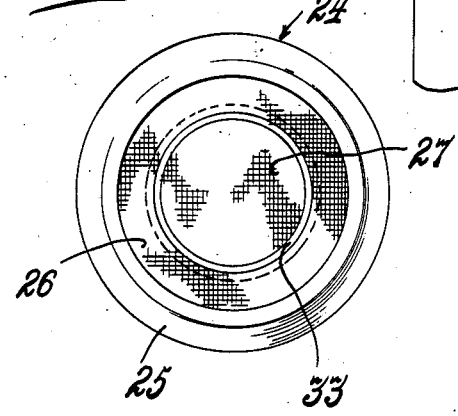
Fig. 3 is an inverted plan view of the filter.

Under ordinary conditions particles of dirt, or the like strike the filter and drop back into the water chamber 11. However, when an excessive amount of dirt adheres to the filteer it materially restricts or clogs the passage of the liquid therethrough, and as a result the water trapped in chamber 11 rapidly increases in temperature. When the temperature reaches approximately 212° F., the solder 33 melts, freeing the screen insert 27. In such instance, the insert is carried upwardly into a position substantially as illustrated in dotted lines in Fig. 1. The water may then freely pass through the opening effected by displacement of the insert and flow through the open valve to the radiator 13.

It is apparent that efficient operation of the thermostat is insured by the novel filter 24, thus maintaining high motor and hot water heater efficiency. It should be noted that the motor cannot become damaged by over-heating as a result of the filter clogging because the insert is displaced and the water passes through the opening formed by said displacement.

It should be understood; that, because various types of thermostats are now in use and, because various methods of installation are practiced, the particular shape and size of the filter may vary to suit particular installations. However, in each instance, a separable insert is provided for displacement upon melting of the fusible alloy, and the disclosure herein is, therefore, illustrative and not restricted and it is accordingly not desired to be limited to the precise details herein disclosed and specifically described.

I claim:

1. In a liquid circulation system, a filter including a separable filter section secured in position by a fusible alloy which fuses at substantially the temperature of the boiling point of the liquid used in the circulation system.

2. A filter for filtering fluids flowing through a passageway comprising a screen having an opening, a filter section over said opening, and a fusible alloy securing said filter section in place, said alloy fusing at substantially the temperature of the boiling point of the liquid used in the circulation system.

3. In combination with a liquid circulating system having a thermostat, a filter associated with said thermostat, said filter including a separable filter section secured in place by a fusible alloy, said alloy fusing at substantially the temperature of the boiling point of the liquid used in the circulation system.

4. In a liquid circulation system, a thermostat, a filter associated with said thermostat, said filter including a cylindrical body open at its ends, a filter section extending across the opening in one of said ends, and a fusible alloy securing said filter section in place, said alloy fusing at substantially the temperature of the boiling point of the liquid used in the circulation system.

5. A filter for filtering fluids flowing through a passageway comprising, a substantially cylindrical screen body open at its ends, an external mounting flange on one end of said body, the other end formed with a supporting shoulder, a screen seated on said shoulder, and a fusible alloy joining said screen and said body, said alloy fusing at substantially the temperature of the boiling point of the liquid used in the circulation system.

6. A filter for filtering fluids flowing through a passageway comprising, a substantially cup-shaped screen open at its bottom, a screen insert over said opening, and fusible means retaining said insert in place, said fusible means fusing at substantially the temperature of the boiling point of the liquid used in the circulation system.

7. A filter for a liquid circulating system comprising a foraminous filter member having a separable foraminous filter section therein, means including a fusible alloy for retaining said separable filter section normally in an operative position to filter the circulating liquid, said alloy being fusible at substantially the boiling point of the liquid in the circulating system for releasing said filter section when the temperature of the liquid reaches the boiling point.

8. A filter for a liquid circulating system comprising a foraminous filter member having a liquid flow opening therein, means normally overlying said opening for restricting flow of liquid therethrough and automatically movable to increase the flow of liquid through said opening when the temperature of the liquid reaches the boiling point, and means including a fusible alloy for releasably retaining said flow restricting means normally in flow restricting position, said alloy having a melting point coinciding substantially with the boiling point of the circulating liquid.

9. A filter device for filtering a liquid flowing through the conventional cooling system of an internal combustion engine including a passageway, comprising a foraminous filter section in said passageway, holding means for normally holding said filter section in its operative position in said passageway, comprising a fusible solder which melts at substantially the boiling point of said liquid, said holding means releasing said filter section when the temperature of the liquid flowing through said passageway reaches the boiling point.

ELMER J. PRATT.